D. P. HEFLEBOWER.

Improvement in Devices to prevent Hogs from Rooting.

No. 117,883.                                                           Patented August 8, 1871.

117,883

UNITED STATES PATENT OFFICE.

DANIEL P. HEFLEBOWER, OF CHAMPAIGN COUNTY, OHIO.

IMPROVEMENT IN DEVICES TO PREVENT HOGS FROM ROOTING.

Specification forming part of Letters Patent No. 117,883, dated August 8, 1871.

*To all whom it may concern:*

Be it known that I, DANIEL P. HEFLEBOWER, of Champaign county and State of Ohio, have invented a new and useful Improvement on a Device for Preventing Hogs from Rooting; and I do hereby declare that the following is a full, clear, and exact description of the construction and operation of the same, reference being had to the annexed drawing making a part of this specification, in which—

Figure 1:
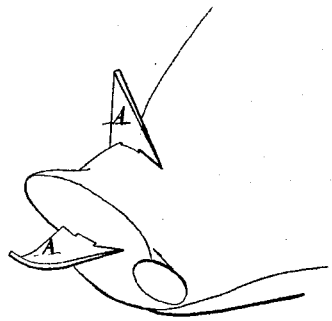
Figure 2:
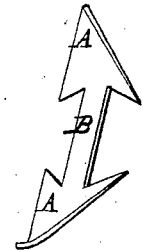
Figure 3:
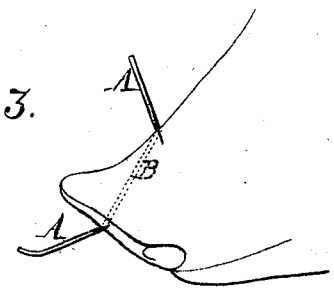

Figure 2 is a perspective view of the device.

I make them out of wrought or malleable cast-iron, and instead of having but one pointed head to be exposed when inserted in the ring of a hog's nose, as others have made them before, I make mine double—that is, both ends or heads A A are made alike, and are bent flatwise about forty-five degrees from the stem B, so that when inserted in the ring of a hog's nose there will be a point above as well as below, that with the outward inclination of the points, due to the bend given them, it would be impossible for the hog to root, or open bars or gates, without inflicting pain upon himself. And while it is a perfect preventive to rooting or gate-opening, it does not in the least hinder the hog from eating whatever is given him.

Having thus described my anti-hog rooter, &c., what I claim as my invention, and desire to secure by Letters Patent, is—

The device for preventing hogs from rooting and raising gates, &c., consisting of a shank, provided with a barbed and pointed head at each end, each head being bent forward to form an angle with the shank, and the lower head being slightly turned up at the point, substantially as specified.

D. P. HEFLEBOWER.

Witnesses:
   L. H. MILLER,
   HORACE G. HAPPERSETT.